(12) United States Patent
Selea et al.

(10) Patent No.: US 12,167,479 B2
(45) Date of Patent: Dec. 10, 2024

(54) SYSTEM, APPARATUS AND METHODS FOR CBRS CPE INSTALLATION

(71) Applicant: BLiNQ Networks Inc., Markham (CA)

(72) Inventors: Radu Bogdan Selea, Nobleton (CA); Alexandru Moraru, Toronto (CA); Terasan Niyomsataya, Nepean (CA); Yigit Ozcan, Markham (CA)

(73) Assignee: BLiNQ Networks Inc. (CA)

( * ) Notice: Subject to any disclaimer, the term of this patent is extended or adjusted under 35 U.S.C. 154(b) by 0 days.

(21) Appl. No.: 17/177,154

(22) Filed: Feb. 16, 2021

(65) Prior Publication Data
US 2021/0259032 A1      Aug. 19, 2021

Related U.S. Application Data

(60) Provisional application No. 62/977,420, filed on Feb. 17, 2020.

(51) Int. Cl.
*G06F 8/61* (2018.01)
*G06F 16/22* (2019.01)
(Continued)

(52) U.S. Cl.
CPC .............. *H04W 76/14* (2018.02); *G06F 8/61* (2013.01); *G06F 16/22* (2019.01);
(Continued)

(58) Field of Classification Search
CPC ..... H04W 76/14; H04W 24/08; H04W 28/16; H04W 84/12; H04W 16/22; G06F 8/61; G06F 16/22; H04L 67/1097
See application file for complete search history.

(56) References Cited

U.S. PATENT DOCUMENTS

| 2021/0127346 A1* | 4/2021 | Hmimy | H04W 72/14 |
| 2021/0227396 A1* | 7/2021 | Khalid | H04W 16/28 |

(Continued)

OTHER PUBLICATIONS

BLiNQ Networks Inc., YouTube video demonstration entitled "CPE Installation (With PointLiNQ Tool and App)", Oct. 4, 2022; https://www.youtube.com/watch?v=I1dknj59RkQ ; Pdf print of example screenshots.

*Primary Examiner* — Derrick W Ferris
*Assistant Examiner* — M Mostazir Rahman

(57) ABSTRACT

A system, apparatus and method for installation of outdoor CPE (Customer Premise Equipment) for CBRS (Citizen Broadband Radio Service) for fixed wireless access is disclosed. The system comprises a database server which stores data comprising eNodeB locations and details, pathloss models and throughput prediction data. A position/orientation sensor and WiFi access point are attached to the CPE during installation. For a specified CPE height and a range of pointing angles, a smartphone app is used in scan mode to obtain KPI and evaluate nearby eNodeBs for performance based on stored parameters and link type, to provide estimated UL/DL throughput data for each eNodeB. After selecting an eNodeB, in network entry mode, a RF link between the CPE and eNodeB is established to request SAS grant. If successful in entering operational mode, actual throughput is measured to ensure the desired performance is attained, and data are reported back to the database.

17 Claims, 10 Drawing Sheets

(51) Int. Cl.
*H04L 67/1097* (2022.01)
*H04W 24/08* (2009.01)
*H04W 28/16* (2009.01)
*H04W 76/14* (2018.01)
*H04W 84/12* (2009.01)

(52) U.S. Cl.
CPC ......... *H04L 67/1097* (2013.01); *H04W 24/08* (2013.01); *H04W 28/16* (2013.01); *H04W 84/12* (2013.01)

(56) References Cited

U.S. PATENT DOCUMENTS

2021/0227628 A1* 7/2021 Sevindik ............... H04W 88/06
2022/0338017 A1* 10/2022 Cimpu ................. H04W 24/02

* cited by examiner

Overall System Architecture for
CBRS CPE Installation Process

Flow Diagram for CBRS CPE Installation Process

1. Update - Initial Data Entry

1. Update - List of Potential Target eNBs

2. Survey and Fine Tuning

3. Installation - Scanning and Pointing

| RSRP Value | RSRP Quality |
|---|---|
| > -90 dbm | Excellent |
| -90 dbm to -105 dbm | Good |
| -106 dbm to -115 dbm | Fair/Average |
| < -115 dbm | Poor |

| SINR Value | SINR Quality |
|---|---|
| > 13.5 | Excellent |
| 10.5 - 13 | Good |
| 5 - 10.5 | Fair/Average |
| < 5 | Poor |

3. Installation - Scanning and Pointing Example
Color Coding of RSRP and SINR Values

SYSTEM, APPARATUS AND METHODS FOR CBRS CPE INSTALLATION

CROSS REFERENCE TO RELATED APPLICATION(S)

This application claims priority from U.S. provisional patent application No. 62/977,420 filed Feb. 17, 2020, entitled "System, Apparatus and Methods for CBRS CPE Installation", which is incorporated herein by reference in its entirety.

TECHNICAL FIELD

This disclosure relates to installation of outdoor CPE (Customer Premise Equipment) for CBRS (Citizen Broadband Radio Service).

BACKGROUND

CBRS is a 150 MHz wide broadcast band of the 3.5 GHz band (3550 MHz to 3700 MHZ). The FCC has authorized use of the CBRS band for wireless service provider commercialization, e.g. for LTE and 5G wireless networks. A device for CBRS is referred to as a CBSD (Citizens Broadband radio Service Device) and may be a Category A or Category B device. Category B (or type B) CBSD are designed for deployment outdoors, at a height of ≥6 meters above terrain.

Many prior art installation and antenna pointing applications have been designed for satellite CPE's or Fixed Wireless Access CPE's, all based on real-time KPI (Key Performance Indicator) collection in synch with a pointing process. Compared to prior art installation and pointing processes, there are new requirements and roadblocks in play for CBSD installation:

The definition of broadband connectivity as defined by FCC has raised the bar from the perspective of installation requirements, such that the performance needs to be significantly higher. For example, the latest CPE technology integrates complex multiple antennas with different characteristics. Therefore, basic KPI evaluation, such as assessing best received signal strength, is not sufficient to indicate best performance, e.g. highest sustainable download and upload speeds.

The new CBRS band is a shared band and any Category B device (CBSD) requires registration to a SAS (Spectrum Access System) and also requires a connectivity grant from the SAS to become operational. That creates a strict requirement on type B CBSD's, i.e. as outlined by the FCC which specifies: "The total transmit time above +23 dBm/10 MHz prior to the receipt of a Grant shall not exceed any of 1 second within any 10-second period, 10 seconds within any 5-minute period, or 20 seconds within any 1-hour period." Therefore, the capacity of a CPE (CBSD) to try to connect multiple times and check performance is strictly limited, given the fact a total time for installation is desired to be in a 90 minutes range, including mechanical and hardware commissioning.

Another roadblock is assessment of serviceability of the location before installer truck roll, especially before the complex process of hardware (HW) installation on a building structure, such as a rooftop or wall. Traditionally this problem has been solved by RF planning that would establish if a specific customer location is serviceable. For urban areas, there are numerous digital maps and clutter maps available, but in rural cases, these may not be recently updated, and moreover do not include an important impairment: a 3D profile of trees and foliage.

Data throughput reliability is a difficult problem to solve in rural fixed wireless access as most times impairments (blockages) are owed to trees and foliage that are subject to seasonal changes and high variability based on weather conditions, such as wind and precipitation, e.g. rain or snow.

The complexity of this use-case creates a need for more complex mathematical modeling and prediction apparatus for CPE installation that would address the above-mentioned problems.

SUMMARY OF INVENTION

The present invention seeks to provide systems, apparatus and methods for installation of CPE for CBRS, which address one or more of the above-mentioned issues.

One aspect of the invention provides a system for installation of a CPE (Customer Premise Equipment) comprising a CBSD (Citizens Broadband Radio Service Device) in a communications network comprising a plurality of transceiver nodes (eNB) providing CBRS (Citizens Broadband Radio Service), wherein the CBSD to be installed has directional antennas, the system comprising:

a database server storing information comprising network information, service information and device information;

a mobile communications device configured with an CBRS CPE Installation Application (the APP) for implementation of CBRS CPE installation;

an installation tool comprising a sensor unit for attachment to an adjustable mounting of the CBSD to be installed; the sensor unit comprising:

a position/orientation sensor and a wireless communications interface for establishing a connection to the mobile communications device to communicate position and orientation information;

a wireless communications interface for establishing a wireless connection between the CBSD and the mobile communications device;

a power source; and a processor and a non-transitory machine-readable storage medium storing instructions for execution by the processor;

wherein for CPE installation, the APP on the mobile communications device is configured to establish:

a first communication link with the CBSD to be installed;

a second communications link to the sensor unit to provide position/orientation sensor when attached to the CBSD to be installed;

a third communications link to the database server; and to configure the CBSD to be installed to communicate via a fourth communication link with at least one targeted eNB.

Example embodiments provide a system architecture, apparatus and methods which provide for a fast, reliable and scalable installation process for outdoor CBRS CPE classified as Type B CBSD for fixed wireless access.

Another aspect of the invention provides a method for installation of CPE for CBRS: for example, a process flow comprises: 1. an update step comprising database updates, e.g. comprising network equipment information and channel models; 2. a survey step based on location information acquired prior to install or during installation; 3. an installation step with scanning and pointing; and 4. a CBRS connectivity and traffic test. On completion of installation, a report is generated, and updates are sent to the database server.

A further aspect of the invention provides methods for performance estimation. For example, in an embodiment, a method of performance estimation is based on ML (machine learning) algorithms to provide updated channel models and throughput curves. In another embodiment, a method of performance estimation is based on location KPI collection with RF off, and reconstruction of throughput based on KPI variation over a certain time period.

For example, novel elements are introduced for performance assessment that are specific to an LTE device with multiple highly directional antennas, e.g. based on machine learning algorithms.

For example, in one embodiment, a Smart Device Application (APP) is provided, which includes all required steps and information to complete a novel installation process which meets specified requirements, e.g., requirements summarized in the background section.

In an example embodiment, a system (i.e. "architecture") for installation of CPE comprising a CBSD in a communications network comprising a plurality of nodes (e.g. a plurality of eNB) providing CBRS, wherein the CBSD to be installed has directional antennas, the system comprising:
  a database server storing network, service and device information;
  a mobile communications device, such as a smartphone or tablet/mobile computing device, et al., configured with an CBRS CPE Installation application (the APP) for implementation of CBRS CPE installation;
  a position/orientation sensor for attachment to the CPE to be installed;
  wherein for CPE installation,
  the APP on the mobile communications device is configured to establish:
  a. a first communication link with the CPE to be installed, e.g. connecting a USB Wi-Fi dongle to the CPE for a WiFi connection between the CPE and a smartphone;
  b. a second communications link to the position/orientation sensor when attached to the CPE to be installed, e.g. a Bluetooth connection between the sensor and the smartphone;
  c. a third communications link to the database server, (e.g. from the smartphone via an available Wi-Fi/LTE/5G/ other internet connection); and
  d. to configure the CPE to be installed to communicate via a fourth communication link with one or more targeted eNBs.

In an example embodiment, a method of installation of a CPE comprising a CBSD in a CBRS network, comprises:
  an update process comprising: obtaining information comprising network, device, and service information comprising: device information for the CBSD to be installed; installation location; SLA; available eNB information; et al.;
  based on said information, if required updating the database, and retrieving/building models for installation of the CBSD to be installed;
  a survey process comprising: for proposed installation location, performing a location survey to obtain GPS data, eNB list, (prior to installation based on stored information or at time of installation, from on-site information) and determining target eNB, channel model, CPE height (and other required parameters);
  an installation process comprising: for each targeted eNB, putting the CPE in scan mode, point EL and AZ and collecting KPIs; estimating DL and UL throughputs; selecting a target eNB providing a maximum satisfactory performance; attempting a connection to selected target eNB;
  a connectivity and traffic test process comprising: obtaining SAS grant for connection to the target eNB; collecting parameters comprising KPIs and estimating DL and UL throughput;
  confirm whether or not parameters meet SLA; and
  if successful generate Report; OR
  if not successful return to installation process and select a different target eNB;
  and continue until successful, OR time out.

The update and survey process may be carried out prior to installation, and at the time of installation, the process comprises retrieval of stored information prior to the installation process and connectivity and traffic test process, e.g. an information retrieval process comprising: a) device information for the CBSD to be installed comprising any one or more of installation location; SLA; available eNB information; and other required parameters, and b) location survey information comprising any one or more of GPS data, eNB list, channel model, CPE height and other required parameters.

For example, a system architecture, apparatus and methods of an embodiment are disclosed, comprising:
  Usage of ML predefined prediction models that are portable and adjustable to assess opportunity of each installation action;
  A method to fine tune a prediction model at a customer location such that the installer can decide on the best eNB to connect to, and also specifics of installation, e.g.: location, direction and height of CPE;
  A method to precisely estimate performance (data throughput-TCP and/or UDP) based on a KPI set (Multiple RSRP and SINR readings from each antenna). The method is based on machine learning (ML) algorithms. This method will allow an installer to properly estimate performance without actually turning on RF or execution of a classic Speed Test.
  A method to point and establish optimal position based on an orientation sensor comprising a gyroscope combined with online tips for the installer;
  A method to execute the entire process with or without connectivity to a cloud-based server that contains detailed algorithms and intelligence required for installation process.

The foregoing and other features, aspects and advantages of the present invention will become more apparent from the following detailed description, taken in conjunction with the accompanying drawings, of example embodiments of the invention, which description is by way of example only.

DETAILED DESCRIPTION

Figure 1:
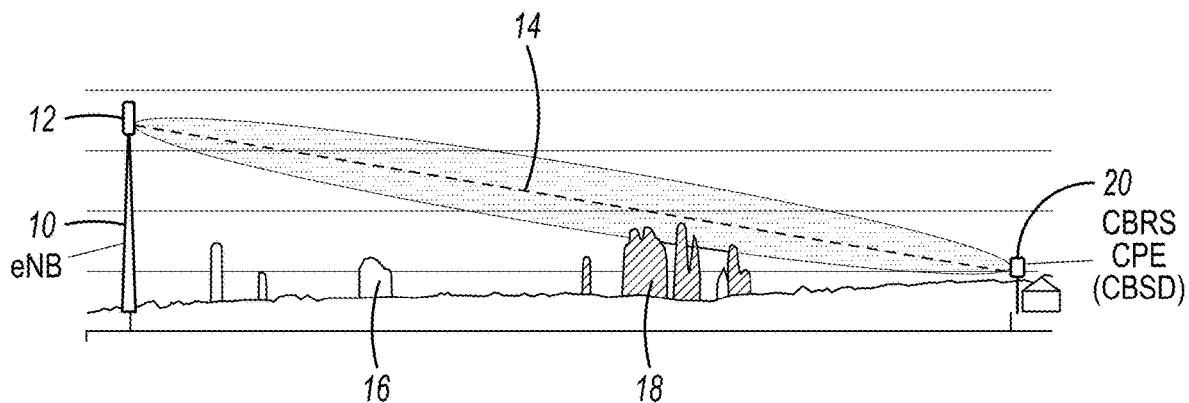
FIG. 1 shows a simplified schematic of an example near line-of-site (nLOS) radio link between an eNB and a CBRS CPE.

FIG. 1 shows a simplified schematic diagram of an example near line-of-sight (nLOS) radio link between an eNB 10 and a CBRS CPE 20 for fixed wireless access. The eNB is a LTE base transceiver station operated by/on behalf of a service provider. The eNB antenna 12 is mounted at a highly elevated position, e.g. on a communications tower, or on top of a tall building, above the clutter. The CBRS CPE 20 is an outdoor unit (ODU) which is mounted 6 m or more above the ground, e.g. it may be pole mounted near a building, or mounted at a suitable height on a building wall, chimney or roof, which may be below the clutter. Clutter refers to obstacles which may comprise buildings 16, geographic obstacles, such as hilly terrain, trees and foliage 18, and include weather related impairments. Geographic obstacles are typically fixed. Buildings and other urban structures change periodically, and digital maps and clutter maps are updated accordingly. Digital maps and clutter maps for rural areas may not be updated as frequently. Trees and foliage may dominate impairments in rural areas, and trees and foliage are subject to significant seasonal foliage variations, as well as year-to-year growth, or removal. Depending on the terrain, the radio link 14 between the cNodeB 10 and the CBRS CPE 20 may be one of several link types, e.g. LOS (line-of-sight) or NLOS (non line-of-sight) et al. The CBRS CPE is mounted on an adjustable mounting bracket which provides for adjustable pointing, i.e. adjustment of the height, azimuth (AZ) and elevation (EL) angles of the CBRS CPE, to connect with a selected eNB and provide optimized radio link performance to meet requirements of a service level agreement (SLA).

Conventional methods for antenna pointing, e.g. for satellite communications links and Fixed Wireless Access using licensed bands, allow for establishing an RF connection and making real-time measurements of KPI (Key Performance Indicators) in synch with a pointing process. For CBRS, to meet the FCC requirement that "The total transmit time above +23 dBm/10 MHZ prior to the receipt of a Grant shall not exceed any of 1 second within any 10-second period, 10 seconds within any 5-minute period, or 20 seconds within any 1-hour period." and considering a typical installation target time for mechanical and hardware commissioning is ≤90 minutes, it not feasible to establish a radio link connection between the CBRS CPE and the eNodeB, and then perform extended real-time measurements of KPI to adjust pointing of the CBRS CPE in a conventional manner. An alternative method is required, e.g. to reduce the connectivity time required to obtain a successful Grant from the SAS.

The system architecture, apparatus and methods presented herein utilize advanced mathematical modeling and prediction methods to characterize network parameters prior to onsite installation, to assist with rapid onsite installation, while complying with the above referenced FCC connectivity time limits for requesting a Grant from the SAS.

In an example embodiment, a system architecture, apparatus and method are described, which support a fast, reliable and scalable installation process for fixed wireless outdoor CBRS CPE classified as Type B CBSD. which is based on improved modelling and prediction prior to onsite CBRS CPE installation. As an example, a currently available CBRS CPE Type B unit is a BLINQ Networks Inc. model number FWC-122HG-35. Type B CBRS CPE require installation by a Certified Professional Installer (CPI).

System Architecture

Figure 2:
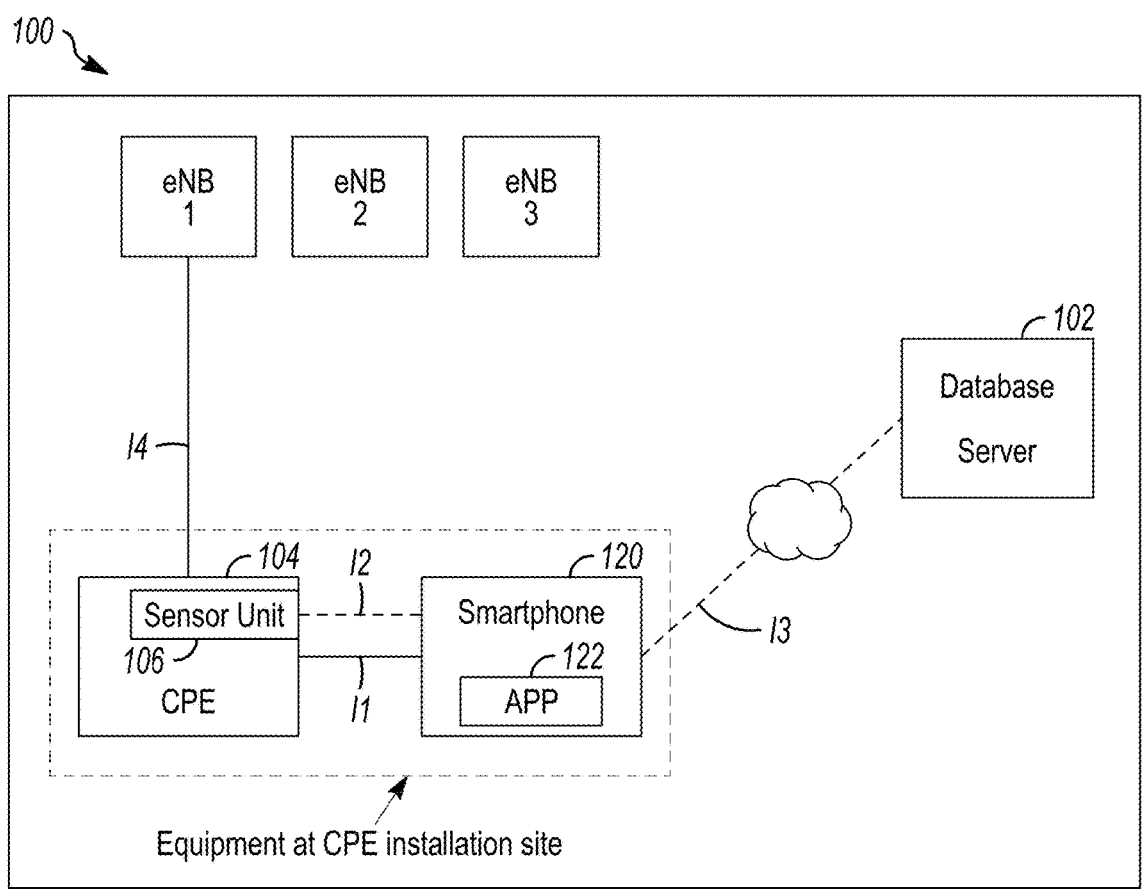
FIG. 2 shows an overall system architecture of a system for CBRS CPE installation of an example embodiment.

FIG. 2 shows a simplified schematic diagram of a system architecture 100 for CBRS CPE installation of a first example embodiment shows components and the 4 main communications interfaces between components. An internet accessible database server 102 stores system information comprising a list of eNBs, their locations and details, path loss models and throughput prediction algorithms. For example, three eNBs 1, 2 and 3 are illustrated schematically in FIG. 2. A CPE 104 to be installed is taken to the installation site, at which a sensor unit 106, comprising an position/orientation sensor is attached to the CPE 104. A mobile communications device, such as a smartphone 104, is configured with a software application (the APP 122) for managing the CPE installation process. For example, a dongle for a WiFi access point is inserted into a USB port of the CPE 104 to provide a first communications interface I1 between the smartphone 120 and the CPE 104. The sensor unit 106 communicates with the smartphone via a second communication interface I2, e.g. a Bluetooth connection, to communicate position and orientation information to the APP. A third communications interface I3 is provided an internet connection is available at the installation site, e.g. using the Smartphone mobile network connection, so that the smartphone may connect with the database server 102 to retrieve stored information or upload new information. If an internet connection is not available at the installation site, required information from the database may be downloaded to the smartphone prior to installation, for local access by the APP during installation. A fourth communication interface is provided between the CPE and a targeted eNB, e.g. eNB 2.

In one example embodiment, the APP is intended to be implemented on a smartphone or a tablet that runs Android or iOS as its operating system, and the following components are used in the CPE installation process:

CPE: CBSD Type B.

Dongle (Wi-Fi access point): In order to receive the physical layer measurements from the CPE, a dongle is used to provide a Wi-Fi access point. The dongle will be connected to the CPE from a USB port of the CPE and then the smartphone will connect to the dongle using Wi-Fi.

Orientation Sensor (Bluetooth Gyroscope): An important part of the installation procedure is the adjustment of the CPE pointing angle. We need to be able to capture the movements of the CPE and determine the pointing angle of the CPE using some sensors. For this purpose, an external sensor is attached to the CPE. This sensor determines the orientation of the CPE in three dimensions and reports these measurements to the smartphone using the Bluetooth connection.

Smartphone APP: This application will run on the phone operating system, e.g. an Android smartphone. The GPS, Bluetooth, Wi-Fi, and LTE connections of the phone are used for data transfer.

Remote Server/Database: For cases where the smartphone is able to connect to internet at the installation site (e.g., using LTE), it will connect to a cloud-based server/database which contains path loss models, eNodeB locations and details, and throughput prediction algorithms.

Interface 1 (I1) is the interface between the smartphone and the CPE. This interface is used for gathering KPI measurements using the q-logs. Note that q-logs are used for CAT12 CPEs. For CAT6 CPEs, the reporting format is different, but the same procedure can be applied here. This report explains the procedure based on CAT12 CPEs, hence using q-logs. An HTTPS connection is opened for this data transmission.

Additional information or control that it is going to be required from the CPE in addition to qlogs (or other types of detailed KPI logs as appropriate) includes:
  Command to control CPE scan mode
  Command to turn on RF connectivity towards eNB
  Status from CBSD Agent related to Grant status and allowed EIRP The CPE can also be used to get some eNB related information, such as PCI number or frequency channel.

Interface 2 (I2) is used to gather the CPE alignment information from the Bluetooth sensor that is attached to the CPE.

Interface 3 (I3) is the connection between the smartphone and the database. This interface is active if the smartphone is able to connect to internet. The commercial LTE connection of the smartphone is used for this interface.

Figure 3:
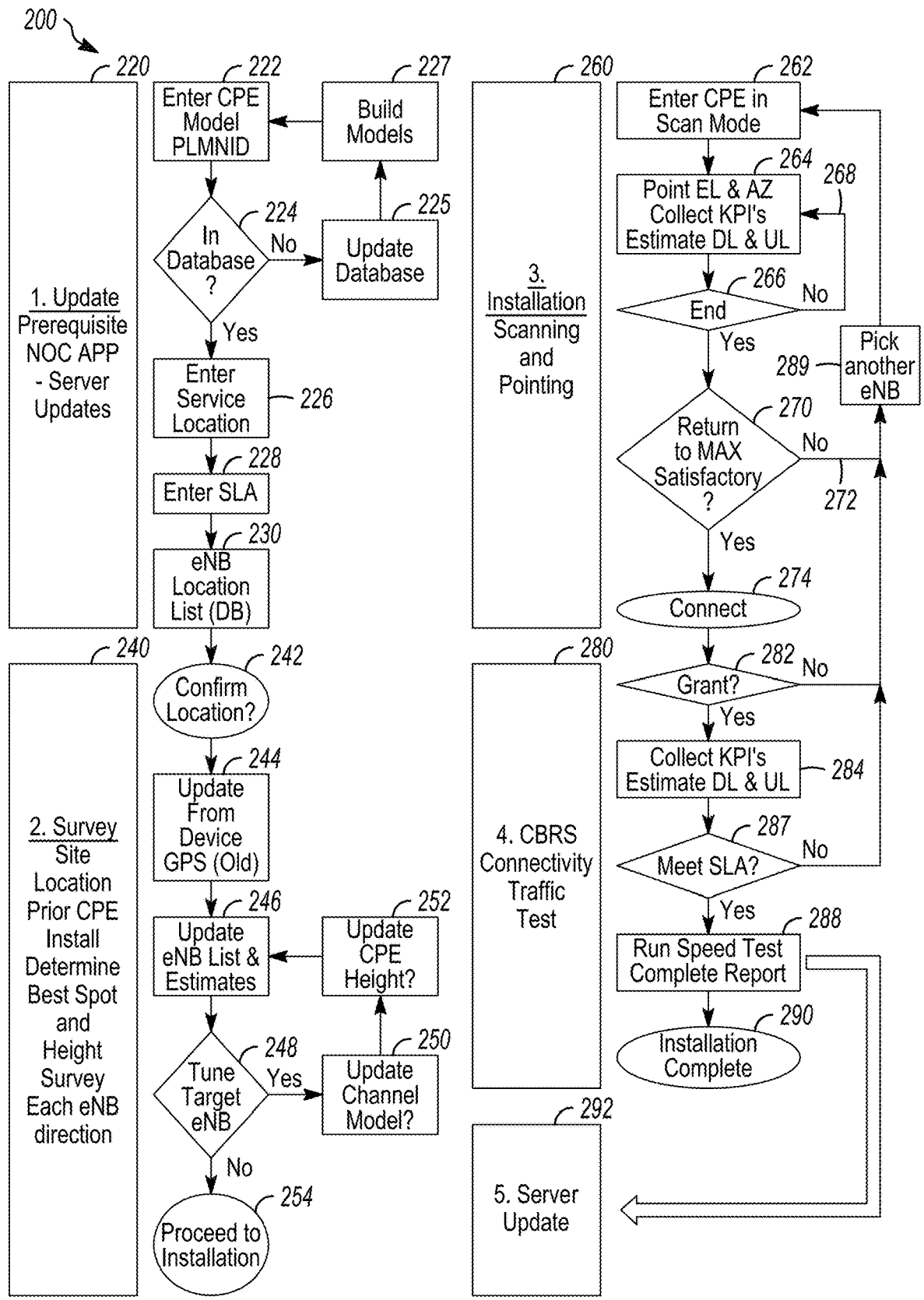
FIG. 3 shows a flowchart to illustrate a CBRS CPE installation process of an example embodiment.

Once the smartphone is connected, the APP periodically updates basic prediction models. once APP and Server are connected or step 1 or step 2 are triggered, context will always be updated as shown in the flow chart in FIG. 3.

If internet connectivity to the database is not available, Step 1 Update is very important as connectivity at the service location might not be available. From the database, the APP acquires the information about the eNBs in close proximity and other information that are required for installation process. More details on the database is given in the next section.

Interface 4 (I4) is the fixed wireless access LTE connection between the CPE and the eNB/EPC which is the goal of installation process. The connection procedure of the CPE to the eNB is not in the scope of the pointing app. This interface is important since the CPE takes the physical layer measurements of the signals received from the eNB and then the CBSD acquires CBRS connectivity with help of the SAS.

The I4 connection will have several states:
  SCAN mode—CPE will listen to eNB and collect KPI's for performance estimation processing;
  Network Entry mode—CPE will connect to the eNB of choice, ask SAS for Grant and once grant is received, will enter in operational mode;
  Operational mode—is the final state of installation process when CBRS connectivity is complete and installer launches a real download/upload throughput test (e.g. Speedtest, Ookla, Iperf) to finally verify that desired performance in attained.

Overall Description of the CBRS CPE Installation Process Application (APP)

A flow chart 200 illustrating the CBRS CPE installation process is shown in FIG. 3. There are 4 main stages:
  1. Update: This includes prerequisite updates at Network Operations Center, including updating the database server and the APP.
  2: Survey: Site location survey may be based on database information available prior to installation or obtained during the installation process.
  3. Installation: including scanning and pointing at the installation location.
  4. CBRS Connectivity and Traffic Test.
  5. Server update: date from the completed report is sent to update the database.

In the initial stage 1. Update 220, the prerequisite data is obtained at the Network Operations Centre (NOC), and the server and the APP are updated. For example, at step 222, the PLMNID is entered, and the model number of the CPE is entered, and the database is queried 224. If network information or CPE information is not in the database for the selected PLMNID and CPE model no, the database is updated 225 and the necessary models are built 227 and stored in the database.

If the required information is found in the database, the service location is entered 226, and the SLA is entered 228. For the service location, a list of nearby eNB and their locations is then generated from the database 230.

In stage 2. Survey 240, the service location is confirmed 242 and if necessary, the location is updated from smartphone GPS data 244. The CNB list is then updated and estimates are obtained for each of a plurality of eNBs. A list of eNBs is presented 246, with their locations relative to the service location, together with estimated throughputs for UL and DL. The installer then can select and fine tune 248 channel models for one or more target eNBs. For example, the channel model for a target eNB may be updated 250 to select a different link type, to update the CPE height 252, or adjust other parameters. The stage 2. Survey may be done prior to installation, and or at the installation site. The survey determines an optimum spot and height for installation of the CPE for each eNB of the list. Installation then proceeds 254.

Stage 3. Installation 260 comprises scanning and pointing. The CPE is positioned at the service location, attached to the orientation sensor, and connected to smartphone running the APP.

The CPE is entered into scan mode 262 while pointing to collect KPI from each target eNB, for different EL and AZ angles 264, 268. The APP provides estimated DL and UL throughputs from the collected KPI. After collecting KPI for each eNB 266, a target eNB is selected which provides optimum performance 270, e.g. maximum (MAX) estimated DL and UL throughputs for the selected CPE location, height and pointing direction, including EL and AZ angles. The CPE is then put into a network entry mode to initiate RF connectivity to the eNB 274 to request Grant from the SAS 282 during stage 4. CBRS Connectivity Traffic Test 280. If the grant is successful, the APP collects KPIs and estimated the DL and UL throughputs 284. If the estimated DL and UL throughputs meet SLA 287, a connectivity traffic test is initiated, including a speedtest 288 and a report including actual measured date is completed 288. If the estimaed DL and UL throughputs are not satisfactory at step 272, or do not meet SLA at step 287, another eNB is picked 289.

At stage 5. Server update 292, the report is sent to the database server to update stored information. Installation is then complete 290.

To further illustrate the CBRS CPE Installation process, some example screenshots of the user interface for the APP are now described.

1: Context Update

In Stage 1. Update, the CPE model and network PLMNID in order to check that certain CPE/CBSD device is already modeled in Data Base for the specific network.

If not found in the Data Base, the CPE model needs to be introduced as per requirements to the Server, e.g.:

Antenna Patterns
Feature List
MCS vs SINR vs TCP, UDP Curves with different eNBs The server will build up models with all compatible eNBs, e.g. based on a definition of compatible or non-compatible eNBs.

Figure 4:
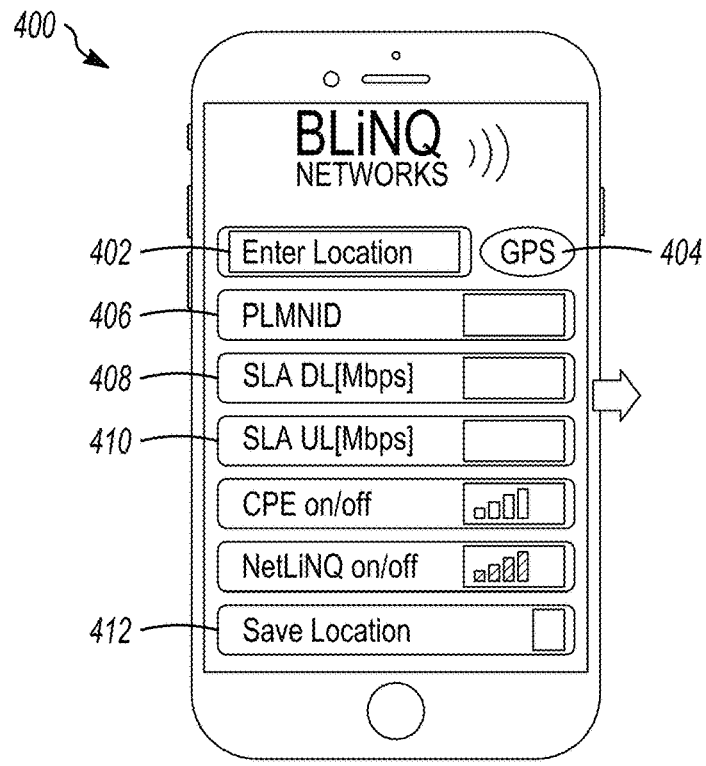
FIG. 4 shows an example User Interface screenshot for 1. Update-initial data entry.

Once the model information has been retrieved or has been entered in the Database, the installer is offered a screen 400 as shown in FIG. 4 to enter network identification PLMNID 406, the service location, which may be an address 402 or e.g. based on an address 402 or GPS coordinates 404 and an SLA for DL 408 and an SLA for UL 410. Optionally other CPE or network information may be entered. The location information is saved 412. The database server will then provide preliminary information on eNB listed in proximity to the service location and the expected performance of each, for example as shown in the screen 500 shown in FIG. 5. This screen shows a list of eNB identified in box 502 by a location, and a distance and direction from the service location, including an arrow 504 to indicate a pointing direction. Also shown are estimated DL throughput 506 and UL throughput 508, which may be color coded to indicated quality, e.g. green is good, red is poor and yellow is intermediate.

Optionally, the Data Base can also display alternate eNB's listed as part of the same network (PLMNID) but listed as non-compatible.

2. Location Survey (See FIG. 6A)

This step can be achieved prior to the installation date, or during the installation process. Once an installer arrives at a location, the installer can reach a favorable position and confirm or update the location from the Smartphone GPS that hosts the APP.

The eNB List and Estimated Performance will then be updated.

Figure 5:
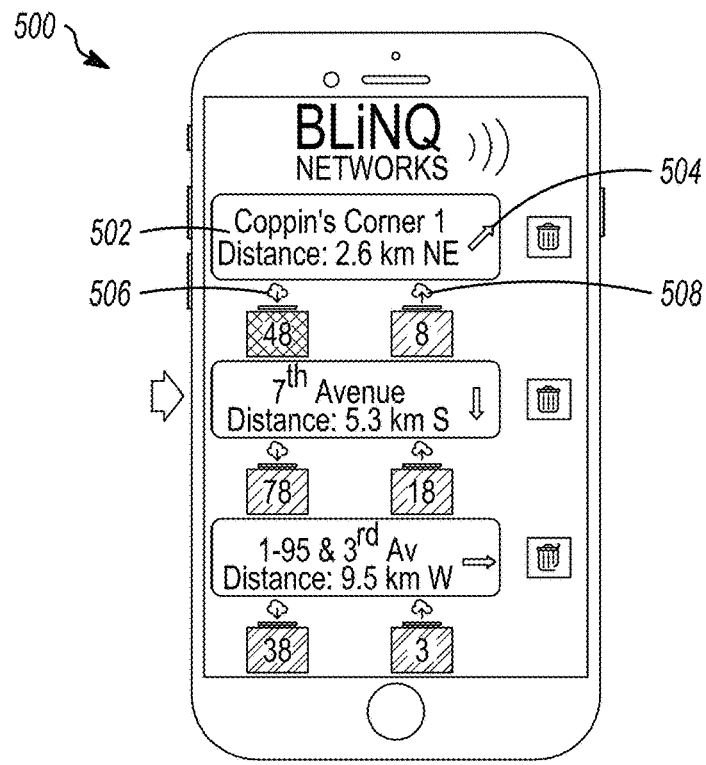
FIG. 5 shows an example User Interface screenshot for 1. Update-list of potential target eNBs.
Figure 6A:
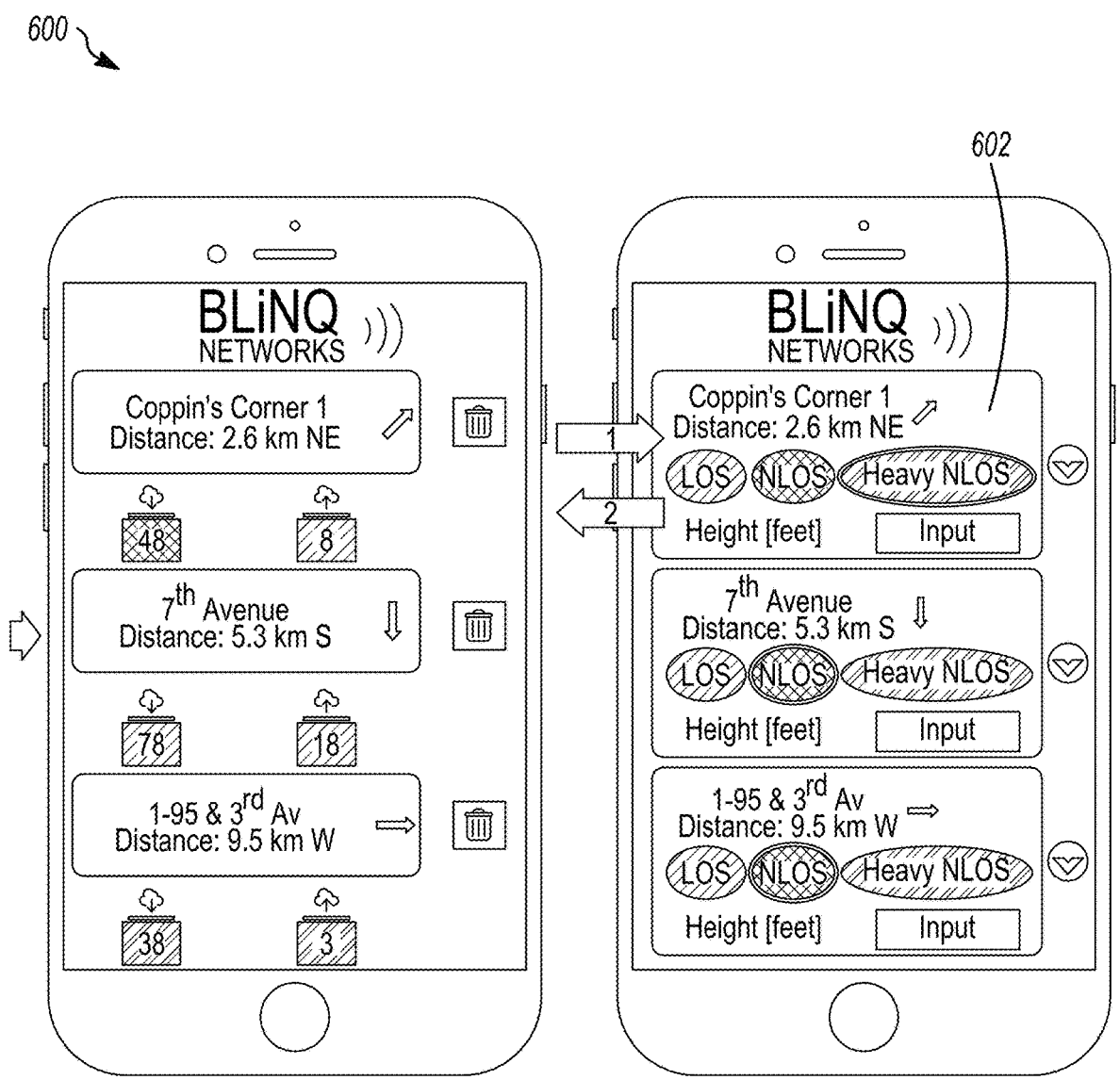
FIG. 6A shows example User Interface screenshots for 2. Survey and fine tuning.
Figure 6B:
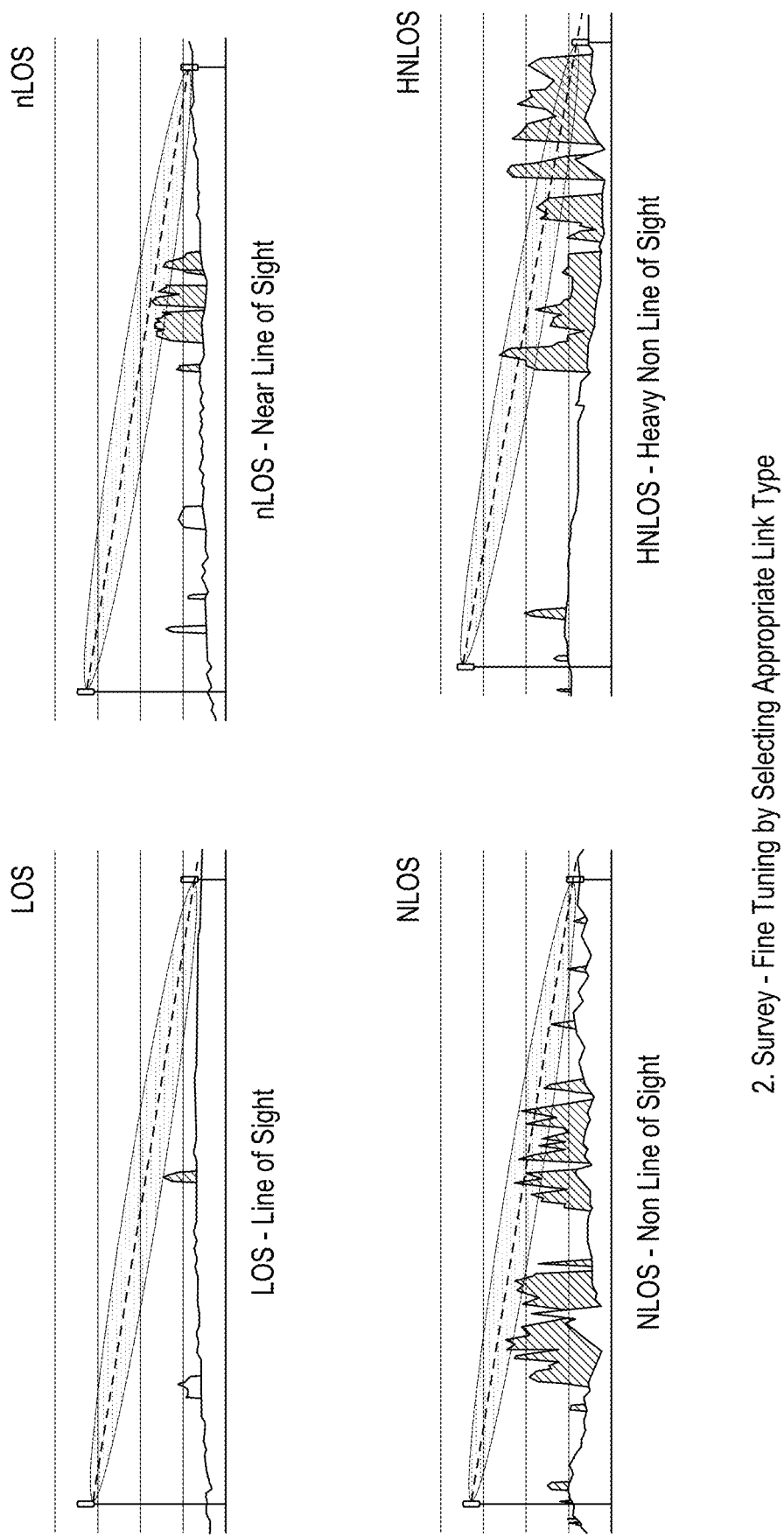
FIG. 6B shows schematic diagrams for 2. Survey-selecting link type for fine tuning.

Referring to the screen shown in FIG. 6A, looking at each eNB connectivity direction, and foreseeing an installation point for each, pressing on specific eNB in the screen to the left (as shown in FIG. 5) will open a fine tune window 600 as shown in the screen to the right of FIG. 6A. In this window, the installer will see the link profile used is highlighted 602, e.g. LOS or NLOS, or HNLOS, and can update it by selecting another channel model. The CPE installation height can also be updated as a function of installation specifics, e.g.: roof, chimney, wall and so on. FIG. 6B shows some examples of LOS, nLOS, NLOS and HNLOS link types.

After the fine-tuning process, the APP will update the performance estimates indicating potential target eNBs.

3. Installation-Scanning and Pointing (See FIG. 7A)

The installer installs the CPE to the appropriate installation location without fixing its alignment.

Installer sets the CPE in SCAN mode

A position sensor, e.g. a small suction-attached orientation sensor comprising a gyroscope, that detects movements is attached to the CPE in an appropriate manner.

A Wi-Fi access point dongle is connected to the CPE, e.g. using a USB port of the CPE and the smartphone connects to Wi-Fi.

The installer starts the application, checking connectivity to both devices.

Figures 7A, 7B:
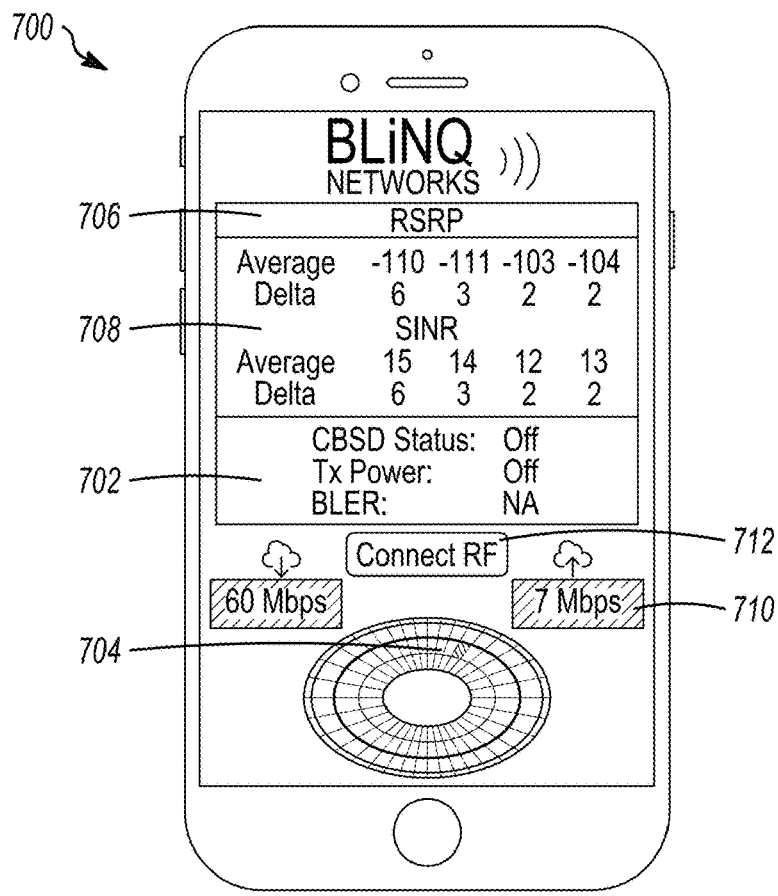
FIG. 7A shows an example User Interface screenshot for 3. Installation-scanning and pointing.
FIG. 7B shows example for 3. Installation-scanning and pointing, example color coding of RSRP and SINR values

Referring to the screen 700 shown in FIG. 7A, the installer points the CPE towards the eNB using the sensor attached to the CPE. Then, the CPE is pointed towards certain directions that are specified by the app, swapping each rectangle from the pointing grid 704, e.g. as displayed in lower part of the screenshot shown in FIG. 7A.

At each position, the CPE stays couple of seconds, and the KPI measurements taken by the CPE are downloaded to the APP using an HTTPS connection between the CPE and the smartphone. APP uses a ML throughput prediction algorithm to make a prediction at each position using these measurements. For example, RSRP estimates 706 are shown and the top of the screen, with SINR estimates 708. This screen includes a Connect RF button 712. As indicated in the middle of the screen 702 the CBSD status is off during collection of KPI data. Estimated DL and UL throughputs are shown at 710. FIG. 7B shows some example values and color coding (as indicated by different cross-hatching patterns) of RSRP and SINR values.

The APP picks the best position that gives the highest predicted throughput. The installer can then lock to this point and enter Step 4. If installer executed this step with an extendible mast, then based on the assessment, the installer can proceed to HW and electrical installation to the home.

4. CBRS Connectivity and Traffic Test (See FIG. 8)

Figure 8:
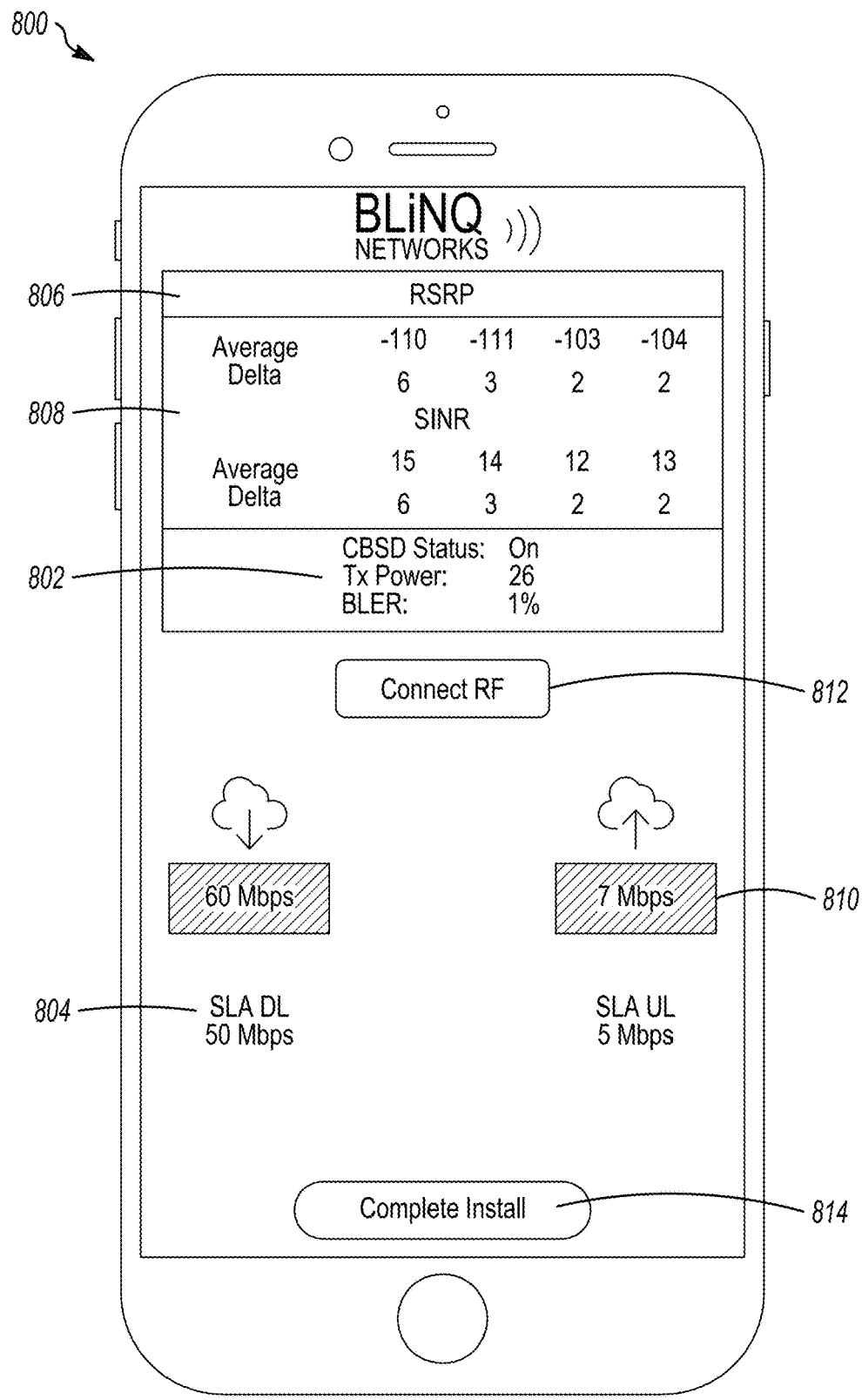
FIG. 8 shows an example User Interface screenshot for 4. Connectivity and Traffic Test.

The installer completes the installation and presses the connect RF button 812 shown in the screenshot 800 shown in FIG. 8. At that point CPE/CBSD will connect to eNB starting Network Entry and will follow to acquire SAS Grant that will complete connectivity steps. Once connectivity achieved within expected parameters (grant and desired EIRP) then a final real traffic test is run, in order to see TCP and/or UDP traffic stability and BLER. Screenshot 800 displays the CBSD status and Tx power 802, RSRP data 806 and SINR data 808; DL and UL throughputs are shown at 810 and DL and UL SLA at 804.

Once the results are satisfactory and meet SLA, the installer presses the complete install button 814, at which an installation report is generated and sent to interested parties.

5. Generate Report and Update Database Server

Figure 9:
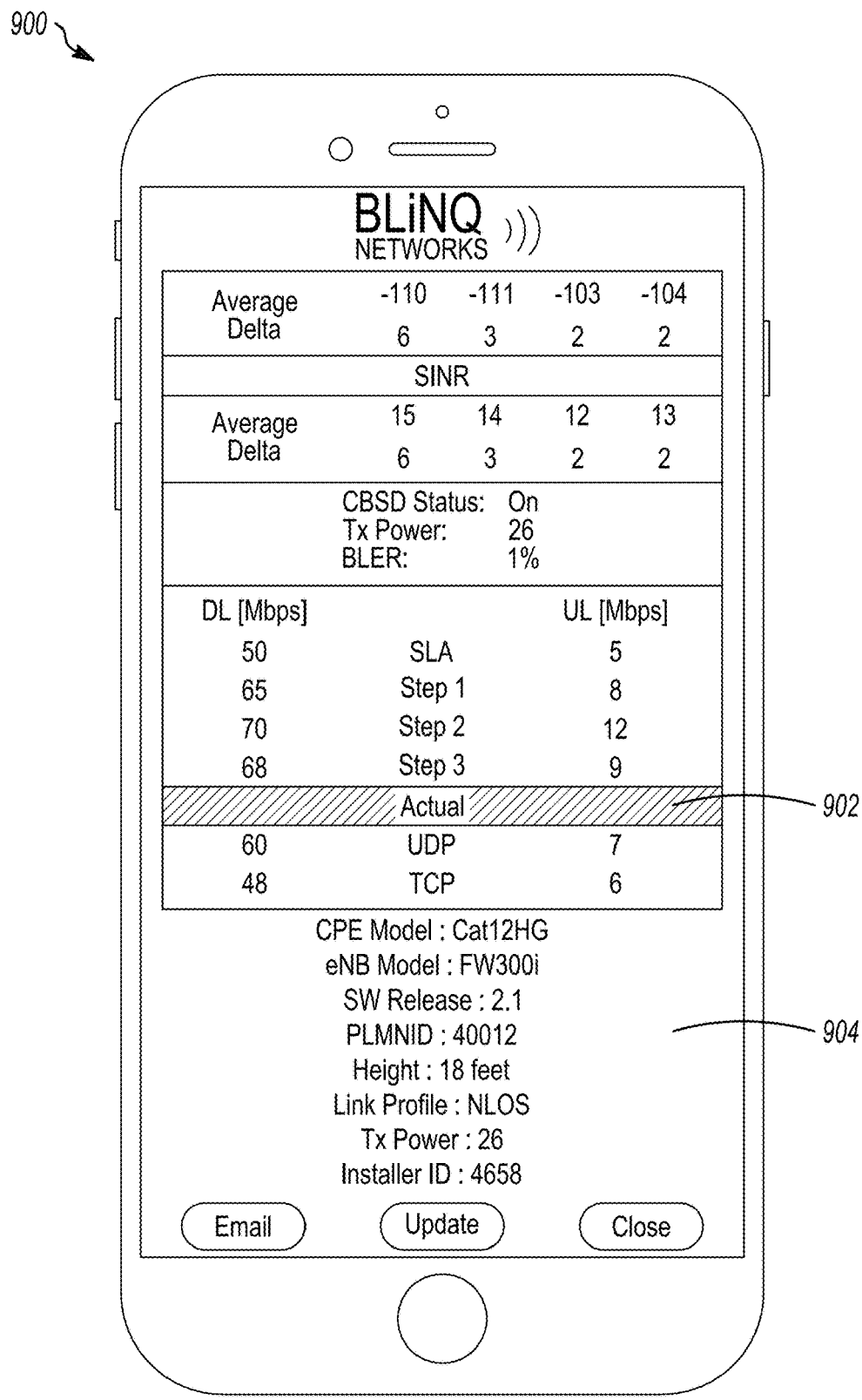
FIG. 9 shows an example User Interface screenshot for 5. Generate Report and update server.

A report generates automatically, e.g. as summarized in the screenshot 900 in FIG. 9, displaying actual throughput values 902 and installation data 904, and updates the Server. The report can also be emailed to a default email set on APP Settings panel.

Database Server

All models of the database server of the example embodiments are built with default values for CPE, installation height and channel models established as default for a specific area (market).

Multiple eNB models might have different SW Releases that will be differently modeled. eNB models are updated per operator per area and are identified by PLMNID.

The database server has an UI capable to input all elements required for equipment and channel modeling. For example, the channel models and clutter information are grouped by regions and such measurements will feed machine learning (ML) algorithms that will update and fine tune estimation models.

Sensor Unit (PointLiNQ™ Tool)

Figures 10A, 10B, 10C:
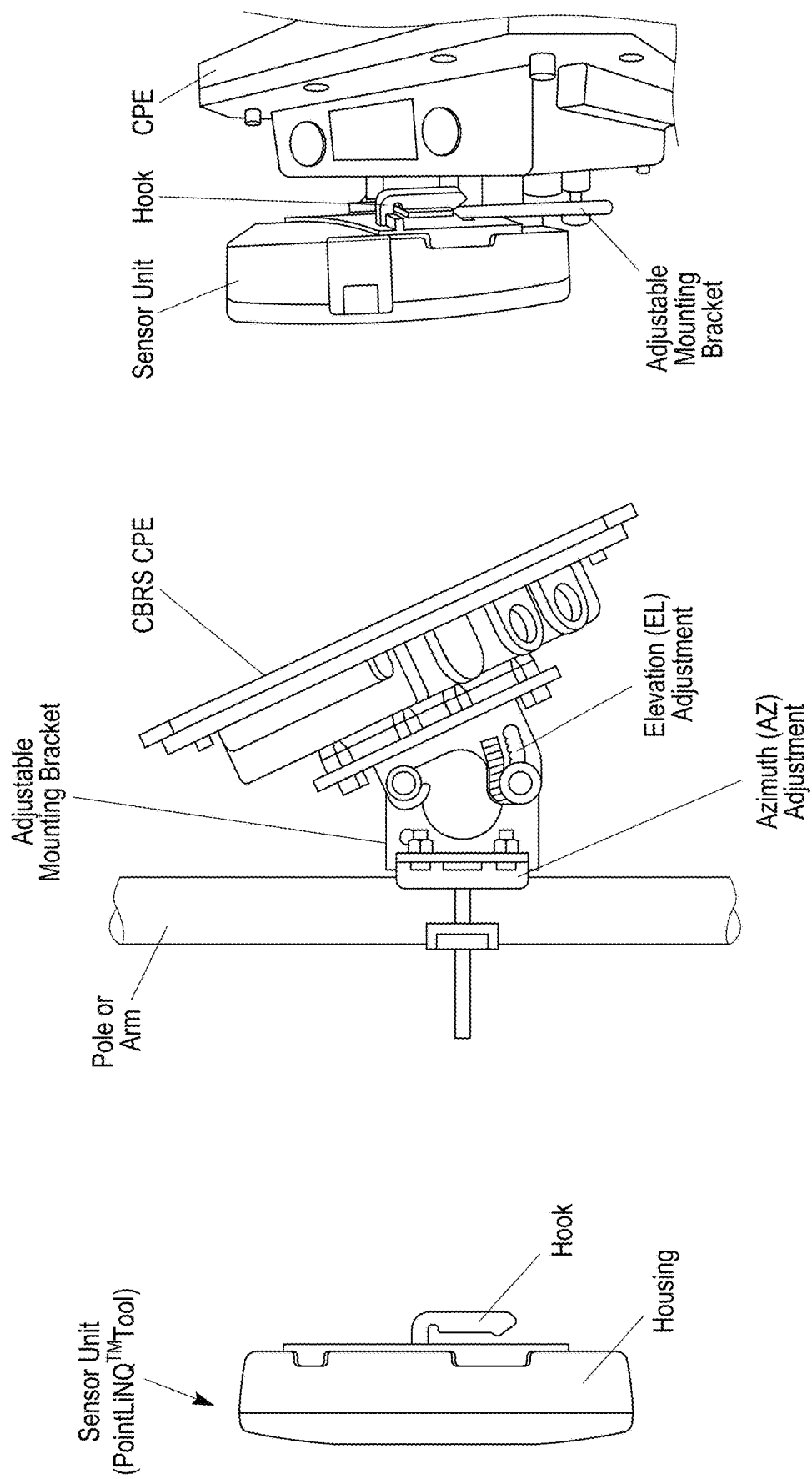
FIG. 10A shows a schematic diagram of sensor unit for a CBRS CPE installation of a second example embodiment.
FIG. 10B shows a schematic diagram of an example CPE mounted on a pole or arm with an adjustable mounting bracket.
FIG. 10C shows the sensor unit attached to the CPE for sensing of orientation during installation.
Figure 11:
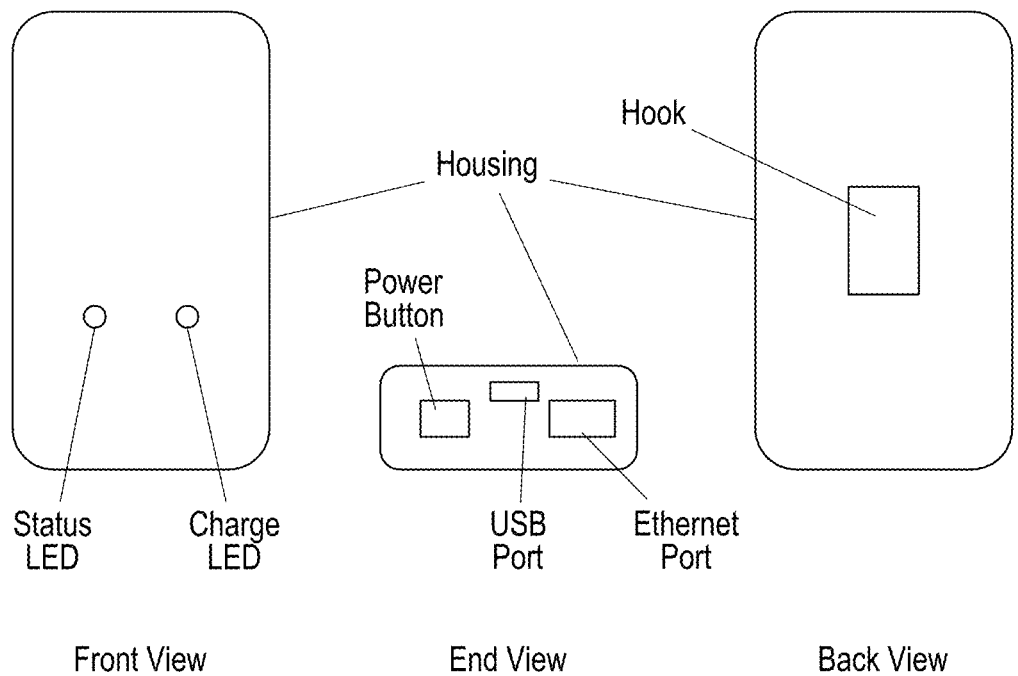
FIG. 11 shows a schematic external diagrams of a sensor unit of an example embodiment.
Figure 12:
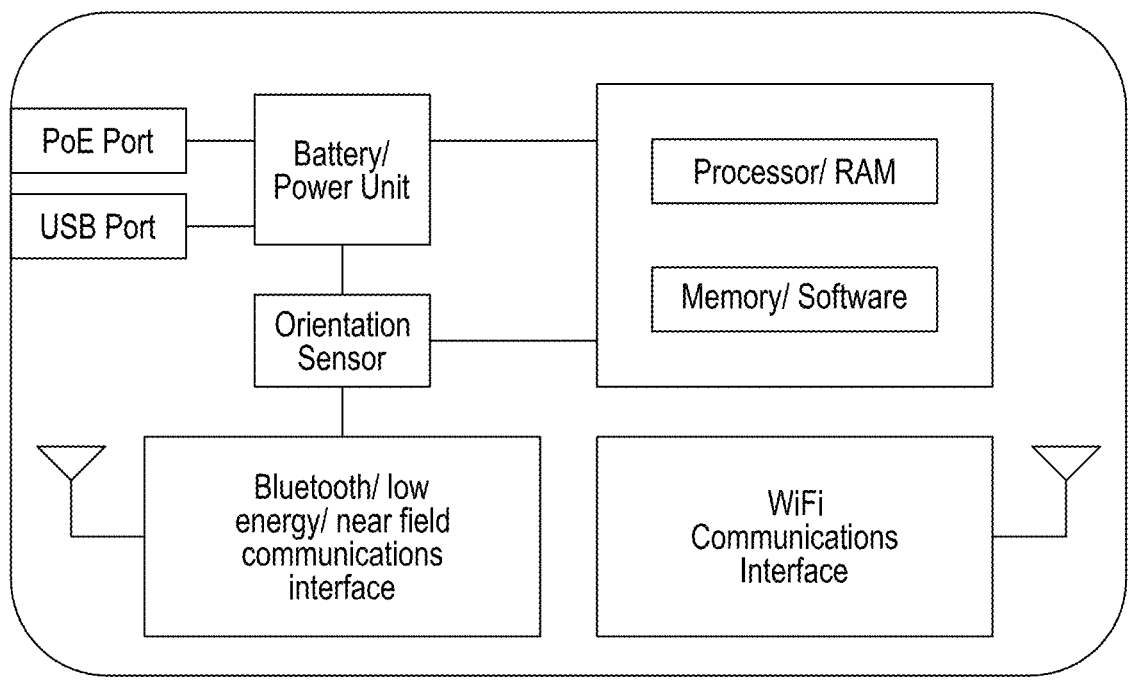
FIG. 12 shows a schematic functional block diagram of components of the sensor unit of the example embodiment shown in FIGS. 10A and 11.

In a system of a second embodiment, the sensor unit is provide as illustrated schematically in FIG. 10A which is a rechargeable unit containing a position/orientation sensor and a WiFi access interface/point. As shown in FIG. 10B the CBRS CPE is mounted on a pole or arm with an adjustable mounting bracket providing adjustment of EL and AZ. The sensor unit has a hook or clip which attaches to the mounting bracket of the CBRS CPE, as shown in FIG. 10C. FIG. 11 shows a schematic diagram of external view of the sensor unit. The USB port provides for charging the unit. In use, the sensor unit is connected to the CBRS CPE by a Power over Ethernet PoE connection. FIG. 12 shows a schematic functional block diagram of components of the sensor unit. The WiFi communications interface is used to connect to the smartphone and provide the communication interface to the APP. The orientation sensor has a Bluetooth connection to communicate position and orientation data to the APP. The sensor unit facilitates the CBRS CPE installation process by integrating these elements within a single housing that attaches simply to the CBRS CPE mounting bracket, e.g. using a hook or clip as illustrated. The sensor unit is to be calibrated at each site to ensure it is pointing north accurately. This is accomplished using the APP on the smartphone, by navigating to the Calibrate screen, and following instructions so that both the phone and the sensor unit are aligned and pointing north to "reset North". The CPE can then be aligned using the Sensor Unit and the App. The CPE and bracket are pointed towards a targeted eNB direction by using the APP. For example, the APP will show a screen indicating the pointing direction for the targeted eNB. The CPE is installed using the centre position for azimuth and no tilt on elevation. The sensor unit is powered on, and the APP connects to the sensor unit WiFi. The sensor unit is attached to the CPE bracket with the hook/clip. A desired eNB is selected using the align button to open an Alignment CPE screen, which shows arrows for the direction that the CPE is aiming and a target eNB direction. The CPE is adjusted until the two arrows overlap. After securing the CPE bracket the CPE can be entered into scanning mode by pressing the SCAN ENB button.

PCI Cell Lock

During scanning, the CPE will identify a LIST of eNBs and the APP will display the eNB scanned list, including a PCI (Physical Cell Identifier). The APP selects the target eNB, and saves the PCI value. The APP is then used to perform the alignment and pointing operation, as described above, followed by SAS registration. Once the SAS registration procedure is complete and the performance throughput test is satisfactory, at that point installation is complete and a button is pressed to signal end of installation procedure. Optionally, at that point, the APP through the API will perform a lock PCI function on the CPE. The PCI lock function can be implemented automatically by the PointLiNQ tool and APP, e.g. based on estimated and measured data For improved reliability, it may be desirable to perform a PCI cell lock to ensure that the CPE connects to the identified cell which provides optimum performance, e.g. strongest RSRP. The PCI cell lock function is intended to restrict a CPE from connecting to another PCI. In some instances, a list of cells (PCI lock list) providing a required performance may be provided, e.g. ranked by RSRP. If the targeted PCI is temporarily unavailable, the CPE may be permitted to connect to another PCI from the PCI lock list. For example, the PCI cell lock feature prevents the CPE from connecting to other PCIs which may adversely affect network performance and stability, e.g. by causing link interference.

Related patent documents: For background information on network planning and management solutions from BLINQ Networks using NetLINQ EMS, see U.S. Pat. No. 10,149,172 and for background information relating to dynamic carrier aggregation to multi-beam antenna mapping, e.g. comprising CBRS component carriers, see US patent publication no. US2020/0028561A1, now U.S. Pat. No. 10,756,803, all of which are incorporated herein by reference in their entirety.

TABLE 1

Acronyms and Abbreviations

| Acronym or Abbreviation | Meaning | |
|---|---|---|
| KPI | Key Performance Indicator | |
| CBRS | Citizens Broadband Radio Service | |
| CPE | Customer Premise Equipment | |
| CBSD | Citizens Broadband radio Service Device (CBRS CPE) | |
| CPE | Customer Premise Equipment | |
| PAL | Priority Access Licence | |
| GAA | General Authorized Access | |
| ML | Machine Learning | |
| FCC | Federal Communications Commission | |
| RF | Radio Frequency | |
| LTE | Long Term Evolution | |
| HW | Hardware | |
| 5G | Fifth Generation | |
| SAS | Spectrum Access System | |
| UE | User Equipment | |
| RSRP | Reference Signal Received Power | dBm |
| SINR | Signal to Interference and Noise Ratio | dB |
| RSRQ | Reference Signal Received Quality | dB |
| TCP | Transmission Control Protocol | |
| UDP | User datagram protocol | |
| PLMN | Public Land Mobile Network | |
| PLMN ID | Public Land Mobile Network Identifier | |
| AZ | Azimuth | |
| EL | Elevation | |
| APP | Software application | |
| API | Application Programming Interface | |
| eNB | eNodeB (transceiver node) | |
| CC | Component Carrier | |
| TDD | Time Division Duplexing | |
| SLA | Service Level Agreement | |
| PKI | Public Key Infrastructure | |
| CPI | Customer Performance Indicator | |
| GPS | Global Positioning System | |
| RSSI | Received Signal Strength Indicator | |
| DL | Downlink | |
| UL | Uplink | |
| SW | Software | |
| HW | Hardware | |
| BLER | Block Error Rate | |
| APP | Software Application | |
| PCI | Physical Cell Identifier | |
| RRM | Radio Resource Management | |
| RAN | Radio Access Network | |
| ESC | Environmental Sensing Capability | |
| EIRP | Equivalent Isotropic Radiated Power | |
| WISP | Wireless Internet Service Provider | |
| E-UTRAN | Evolved Universal Terrestrial Radio Access Network | |
| SCTP | Stream Control Transmission Protocol | |
| EARFCN | E-UTRA Absolute Radio Frequency Channel Number | |

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A system for installation of a CPE (Customer Premise Equipment) comprising a CBSD (Citizens Broadband Radio Service Device) in a communications network comprising a plurality of transceiver nodes (eNB) providing CBRS (Citizens Broadband Radio Service), wherein the CBSD to be installed has directional antennas, the system comprising:
   a database server storing information comprising network information, service information and device information;
   a mobile communications device configured with an CBRS CPE Installation Application (the APP) for implementation of CBRS CPE installation;
   a sensor unit for attachment to an adjustable mounting hardware of the CBSD to be installed; the sensor unit comprising:
      a position/orientation sensor and a wireless communications interface for establishing a connection to the mobile communications device to communicate position and orientation information;
      a wireless communications interface for establishing a wireless connection between the CBSD and the mobile communications device;
      a power source; and
   a processor and a non-transitory machine-readable storage medium storing instructions for execution by the processor;
   wherein for CPE installation,
   the APP on the mobile communications device is configured to establish:
      a first communication link with the CBSD to be installed;
      a second communications link to the sensor unit to obtain said position and orientation information, comprising elevation (EL) and azimuth (AZ), when attached to the adjustable mounting hardware of the CBSD to be installed;
      a third communications link to the database server; and
      to configure the CBSD to be installed to communicate via a fourth communication link with at least one target eNB;
   and during CPE installation by a Certified Professional Installer (CPI), for each target eNB, putting the CPE in scan mode, and for each of a plurality of values of elevation (EL) and azimuth (AZ), collecting key performance indicators (KPIs); estimating downlink (DL) and uplink (UL) throughputs; selecting a target eNB providing a maximum satisfactory performance; and attempting connection to the target eNB; and
   performing a connectivity and traffic test process comprising:
      obtaining Spectrum Access System (SAS) SAS grant for connection to the target eNB;
      collect parameters comprising KPIs and estimated DL and UL throughputs; and
      confirming whether or not said parameters meet a Service Level Agreement (SLA).

2. The system of claim 1, wherein after confirmation of an installation site, comprising a location and height, the APP provides a graphical user interface presenting eNB information to the CPI comprising a list of target eNB and eNB information comprising distance from the installation site, link type, pointing direction from the installation site, and estimated UL and DL throughputs.

3. The system of claim 2, wherein the graphical user interface provides for the CPI to review and select one of a plurality of a link types for a target eNB.

4. The system of claim 2, wherein the graphical user interface provides for the CPI to review eNB information for the list of target eNB and select a target eNB for which estimated UL and DL throughputs meet the SLA requirements.

5. The system of claim 1, wherein the adjustable mounting hardware is manually adjustable by the CPI to each of said plurality of values of elevation (EL) and azimuth (AZ).

6. The system of claim 1, wherein the power source is configured to power the CBSD during installation.

7. The system of claim 6, wherein the power source comprises a rechargeable battery.

8. The system of claim 1, wherein the sensor unit comprises a housing which attaches to the adjustable mounting hardware of the CBSD with an attachment comprising one of: a hook, a clip, and a suction mount.

9. A method of installation of a CPE (Customer Premise Equipment) comprising a CBSD (Citizens Broadband Radio Service Device) in a communication network comprising a comprising a plurality of transceiver nodes (eNB) providing CBRS (Citizens Broadband Radio Service), wherein the CBSD to be installed has directional antennas, comprising:
   an update process comprising: obtaining information comprising: device information for the CBSD to be installed; installation location; service level agreement (SLA); and available eNB information;
   based on said information, if required, updating a database, and obtaining models for installation of the CBSD to be installed;
   a survey process comprising: for a proposed installation location, performing a location survey to obtain GPS data, a list of available eNB, and determining at least one target eNB, channel model, and CBSD height;
   an installation process comprising:
      during the installation process, attaching to the CBSD a sensor unit comprising a position/orientation sensor and a wireless communications interface for establishing a connection to a mobile communications device to communicate position and orientation information;
      a wireless communications interface for establishing a wireless connection between the CBSD and the mobile communications device;
      a power source; and
      a processor and a non-transitory machine-readable storage medium storing instructions for execution by the processor; and
   for each target eNB, putting the CPE in scan mode, pointing the CPE to a plurality of values of elevation (EL) and azimuth (AZ) and collecting key performance indicators (KPIs); estimating downlink (DL) and uplink (UL) throughputs; selecting a target eNB providing a maximum satisfactory performance; and attempting connection to selected target eNB;
   performing a connectivity and traffic test process comprising:
      obtaining Spectrum Access System (SAS) grant for connection to the target eNB;
      collect parameters comprising KPIs and estimated DL and UL throughputs;
      confirming whether or not said parameters meet the SLA; and
      if successful generating a Report; OR if not successful returning to the installation process and selecting a different target eNB;

and continuing until successful, OR time out.

10. A method of installation of a CPE (Customer Premise Equipment) comprising a CBSD (Citizens Broadband Radio Service Device) in a communication network comprising a plurality of transceiver nodes (eNB) providing CBRS (Citizens Broadband Radio Service), wherein the CBSD to be installed has directional antennas, comprising:

an information retrieval process comprising obtaining information comprising network information, device information, service information;

an installation process comprising:

during the installation process, attaching to the CBSD a sensor unit comprising a position/orientation sensor and a wireless communications interface for establishing a connection to a mobile communications device to communicate position and orientation information;

a wireless communications interface for establishing a wireless connection between the CBSD and the mobile communications device;

a power source; and a processor and a non-transitory machine-readable storage medium storing instructions for execution by the processor; and for each of a plurality of targeted eNB, putting the CBSD in scan mode, pointing the CBSD to a plurality of values of elevation (EL) and azimuth (AZ) and collecting Key Performance Indicators (KPIs); estimating downlink (DL) and uplink (UL) throughputs; selecting a target eNB providing a maximum satisfactory performance; and attempting connection to selected target eNB;

performing a connectivity and traffic test process comprising: obtaining Spectrum Access System (SAS) grant for connection to the target eNB; collecting parameters comprising KPIs and estimating DL and UL throughputs;

confirming whether or not said parameters meet a Service Level Agreement (SLA); and if successful generating a Report; or if not successful returning to installation process and selecting a different target eNB;

and continuing until successful, OR time out.

11. The method of claim 10, wherein estimating downlink (DL) and uplink (UL) throughputs comprises scanning and pointing during installation to estimate DL and UL throughputs.

12. The method of claim 10, wherein estimating downlink (DL) and uplink (UL) throughputs comprises scanning prediction prior to installation, based on stored information and machine learning.

13. The method of claim 10, wherein estimating downlink (DL) and uplink (UL) throughputs comprises:

scanning prediction prior to installation, based on stored information and machine learning to identify one or more target eNB; and scanning and pointing during installation to estimate DL and UL throughputs for fine tuning of pointing to a selected target eNB.

14. The method of claim 10, wherein after the step of: if successful generating a Report, detaching the sensor unit for recalibration and reuse at a subsequent installation site.

15. A mobile communications device for use in installation of CPE (Customer Premise Equipment) comprising a CBSD (Citizens Broadband Radio Service Device) in a communication network comprising a plurality of transceiver nodes (eNB) providing CBRS (Citizens Broadband Radio Service), wherein the CBSD to be installed has directional antennas, wherein an APP is configured to:

establish a first communication link with a CBSD to be installed;

establish a second communications link to a sensor unit comprising a position/orientation sensor attached to the CBSD to be installed;

establish a third communications link to a database server which stores information comprising device information, network information and service information; and configure the CBSD to be installed to establish a fourth communication link to communicate with at least one targeted eNB; and implement a method comprising:

an information retrieval process comprising obtaining network information, device information, service information;

an installation process comprising: for each of a plurality of targeted eNB, putting the CBSD in scan mode, pointing the CBSD to a plurality of values of elevation (EL) and azimuth (AZ) and collecting Key Performance Indicators (KPIs); estimating downlink (DL) and uplink (UL) throughputs; selecting a target eNB providing a maximum satisfactory performance; and attempting connection to selected target eNB;

a connectivity and traffic test process comprising: obtaining Spectrum Access System (SAS) SAS grant for connection to the target eNB; collecting parameters comprising KPIs and estimating DL and UL throughputs;

confirming whether or not said parameters meet SLA a Service Level Agreement (SLA); and if successful generating a Report; or if not successful returning to the installation process and selecting a different target eNB;

and continuing until successful, OR time out.

16. The mobile communications device of claim 15, wherein the APP comprises a non-transitory computer readable storage medium storing instructions, which when executed in a processor of the mobile communications device, implements said method.

17. The mobile communications device of claim 15, wherein after the step of: if successful generating a Report, detaching the sensor unit for recalibration and reuse at a subsequent installation site.

* * * * *